April 13, 1926.                F. W. WANSNER                1,580,936
                     CONTAINER WITH BRUSH WIPING ATTACHMENT
                            Filed Dec. 2, 1925

INVENTOR
Frederick W. Wansner
BY M. C. Frank
ATTORNEY

Patented Apr. 13, 1926.

1,580,936

UNITED STATES PATENT OFFICE.

FREDERICK W. WANSNER, OF PIEDMONT, CALIFORNIA.

CONTAINER WITH BRUSH-WIPING ATTACHMENT.

Application filed December 2, 1925. Serial No. 72,651.

*To all whom it may concern:*

Be it known that I, FREDERICK W. WANS-NER, a citizen of the United States, residing at Piedmont, in the county of Alameda and State of California, have invented certain new and useful Improvements in Containers with Brush-Wiping Attachments, of which the following is a specification.

My invention relates to cans or containers for liquids or semi-liquids, such as oils, paints, varnishes, pastes and greases, and it has special reference to a container having therein an attachment for wiping a brush dipped into the contents of such a container.

An important object of my invention is to construct a container top in such a manner that a brush wiper may be pivotally attached on the inside thereof so that the wiper can be swung clear of the edge of the opening in the top and to a nonwiping position within the container above the level of the contents therein, or swung to the service position in which the wiping portion of the wiper is held above the container opening.

Another object of the invention is to secure the attachment so that it can not slip or slide down into the contents of the container.

A further object of the invention is to secure the brush wiper attachment to the container top in such a manner that it does not interfere with the stirring of the container contents, or prevent the affixing of the cover to the container.

Still further objects and advantages of my invention will be understood from the following detailed description and from the accompanying drawings, in which.

Adverting to the drawings in detail.

Figure 1:
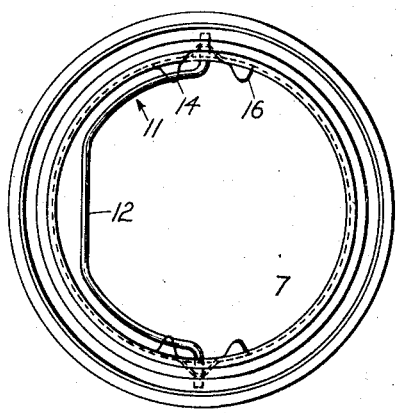
Figure 1 is a plan of a container with a top and a brush wiper constructed according to my invention and with the brush wiper in its non-wiping position in the top; the cover of the container being removed.

To a container 5, which for the convenience of illustration is shown as cylindrical but may be of any other suitable shape, a top 6 may be secured in any preferred manner. In my invention the top 6 has the usual opening 7 therein provided with an inwardly turned flange or rim 8, within which a cover 9 is adapted to fit.

Integral with the rim and extending inwardly therefrom are two diametrically opposed ears 10, each provided with an outward conical depression 10' terminating in an opening. A brush wiper 11, comprising a wire member, preferably of a resilient material such as steel or spring brass, and provided with an intermediate wiping portion 12 and end portions 13, is adapted to be pivotally secured by the end portions in the openings of the ears. Upon each of the ears 10 is formed a stop means comprising a lip 14 at one side of the pivoted end portion 13, so that the wiper is thereby adapted to rest on the lips and to be held thereon by its own weight in a non-wiping position within the container 5 and above the level of the contents 15 therein. At the side of the pivoted end portion 13 opposite to the lip 14, each ear 10 has also formed thereon a stop means comprising another lip 16, and this lip 16 is a little closer to the top 6 than the lip 14 so that, when the wiper is swung from its non-wiping position on the lips 14 and into contact with the lips 16, it will be held on the latter by its own weight in such a position that the intermediate wiping portion 12 is above the opening 7, thus facilitating the wiping of a brush (not shown) thereon and causing the drippings from the brush to fall into the can through the opening.

Figure 3:
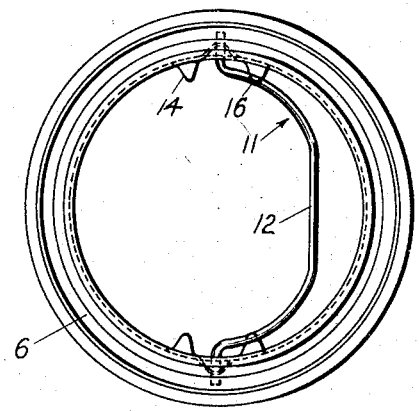
Fig. 3 is a plan similar to Fig. 1, but with the brush wiper in the wiping position above the container top.
Figure 2:
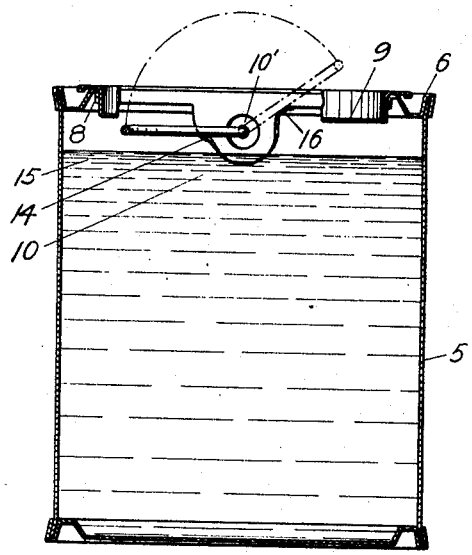
Fig. 2 is a vertical midsection of Fig. 1 with the cover therein also in section and partly broken away, the view showing the brush wiper in full lines as being held in the non-wiping position above the contents of the container and in dot-and-dash lines as being swung to the wiping position.
Figure 4:
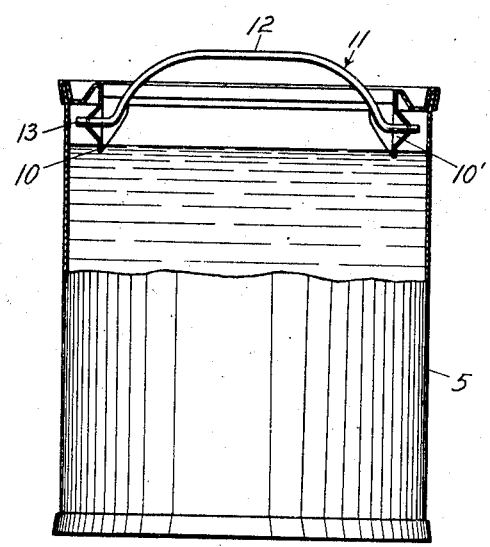
Fig. 4 is a partial, central sectional elevation of Fig. 3 turned at an angle of 90 degrees.

With reference to Figs. 1 and 3 it is seen that the wiper clears the rim 8 so that all brush drippings will follow the wiper until they reach the ears 10 and then trickle down therefrom into the container. Only a moderate care is therefore required to prevent the container from being smeared on its outside with drippings from the brush. As the wiper is light, it may be swung either into the wiping position or the non-wiping position merely by a slight touch of the brush.

For containers not provided with outside handles thereon, such as shown in the drawings, the wiper, after having been cleaned, may also be used as a bail for carrying the container when the cover is removed therefrom.

The depressions 10' being conical, and the wiper being of a resilient material, it is seen that, in order to place the wiper in operative engagement with the ears 10, it is only necessary to compress the wiper and to place the pivots 13 in the depressions, which then will automatically guide the ends into the openings in the ears when the hold on the wiper is released.

Having thus described my invention, I claim as new and desire to secure by Letters Patent of the United States, the following:—

1. A container for liquids or semi-liquids having a top provided with an opening and having an inwardly projecting flange surrounding the opening; the flange provided with a pair of ears; a member pivotally supported in the ears and provided with a wiper portion and adapted to be normally housed within the container and also adapted to be swung so that the said wiper portion will be positioned above the top of the container and the opening therein for service.

2. In combination with a container adapted to hold a liquid or a semi-liquid therein, a top provided with an opening therein and having two diametrically opposed ears formed on the inside of the top and at the edge of the opening; a brush wiper provided with a wiping portion and being pivotally secured in the ears; stop means formed on the ears, the wiper being adapted to rest on said stop means and to be thereby held in a non-wiping position within the container and above the level of the contents therein; and other stop means formed on the ears, the wiper being adapted to be swung from the non-wiping position to a rest position on said other stop means for holding the wiping portion above said opening.

3. In combination with a container adapted to hold a liquid or a semi-liquid therein, a top provided with an opening therein and having two diametrically opposed ears formed on the inside of the top and at the edge of the opening; a brush wiper provided with a wiping portion and being pivotally and removably secured in the ears; stop means formed on the ears, the wiper being adapted to rest on said stop means and to be thereby held in a non-wiping position within the container and above the level of the contents therein; and other stop means formed on the ears, the wiper being adapted to be swung from the non-wiping position to a rest position on said other stop means for holding the wiping portion above said opening.

4. In combination with a container adapted to hold a liquid or a semi-liquid therein, a top provided with an opening therein and having two diametrically opposed ears formed on the inside of the top and at the edge of the opening; a brush wiper comprising a wire provided with an intermediate wiping portion and end portions adapted to be pivotally secured in the ears; lips formed on the ears at one side of the wiper pivots, the wiper being adapted to rest on said lips and to be thereby held in a non-wiping position within the container and above the level of the contents therein; and lips formed on the ears at the side of the wiper pivots opposite to the first-mentioned lips, the wiper being adapted to be swung from the non-wiping position to a rest position on the last-mentioned lips for holding the wiping portion above said opening.

5. In combination with a container adapted to hold a liquid or a semi-liquid therein, a top provided with an opening therein and having two diametrically opposed ears formed on the inside of the top and at the edge of the opening; a brush wiper comprising a wire provided with an intermediate wiping portion and end portions adapted to be pivotally secured in the ears; lips formed on the ears at one side of the wiper pivots, the wiper being adapted to rest on said lips and to be thereby held in a non-wiping position within the container and above the level of the contents therein; and lips formed on the ears at the side of the wiper pivots opposite to the first-mentioned lips, the wiper being adapted to swing clear of the edge of the opening and to be swung from the non-wiping position to a rest position on the last-mentioned lips for holding the wiping portion above said opening.

6. In combination with a container adapted to hold a liquid or a semi-liquid therein, a top provided with an opening therein and having two diametrically opposed ears formed on the inside of the top and at the edge of the opening; a brush wiper comprising a resilient wire provided with an intermediate wiping portion and end portions adapted to be pivotally secured in the ears, the wiper being adapted to be sprung into, and out of, engagement with the ears; lips formed on the ears at one side of the wiper pivots, the wiper being adapted to rest on said lips and to be thereby held in a non-wiping position within the container and above the level of the contents therein; and lips formed on the ears at the side of the wiper pivots opposite to the first-mentioned lips, the wiper being adapted to swing clear of the edge of the opening and to be swung from the non-wiping position to a rest position on the last-mentioned lips for holding the wiping portion above said opening.

In testimony whereof I affix my signature.

FREDERICK W. WANSNER.